(12) United States Patent
Melia et al.

(10) Patent No.: US 11,841,154 B1
(45) Date of Patent: Dec. 12, 2023

(54) METHODS AND SYSTEMS FOR TRACKING THERMAL PROFILE OF HOT WATER STORAGE TANKS

(71) Applicant: HARVEST THERMAL, INC., Kensington, CA (US)

(72) Inventors: Elisabeth Jane Melia, Kensington, CA (US); Evan Green, Escondido, CA (US); Pascual Starink, San Jose, CA (US)

(73) Assignee: Harvest Thermal, Inc., Kensington, CA (US)

(*) Notice: Subject to any disclaimer, the term of this patent is extended or adjusted under 35 U.S.C. 154(b) by 734 days.

(21) Appl. No.: 16/994,446

(22) Filed: Aug. 14, 2020

(51) Int. Cl.
| | |
|---|---|
| *F24D 15/02* | (2006.01) |
| *F24F 11/46* | (2018.01) |
| *G01K 1/14* | (2021.01) |
| *G01F 1/661* | (2022.01) |
| *G01F 1/05* | (2006.01) |
| *G01K 13/02* | (2021.01) |
| *F24H 1/00* | (2022.01) |
| *F24D 19/10* | (2006.01) |
| *G05B 19/042* | (2006.01) |

(Continued)

(52) U.S. Cl.
CPC ............. *F24F 11/46* (2018.01); *F24D 15/02* (2013.01); *F24D 19/1051* (2013.01); *F24F 5/0003* (2013.01); *F24H 1/00* (2013.01); *G01F 1/05* (2013.01); *G01F 1/661* (2013.01); *G01K 1/14* (2013.01); *G01K 13/02* (2013.01); *G05B 19/042* (2013.01); *F24D 15/04* (2013.01); *G01K 13/026* (2021.01); *G05B 2219/2614* (2013.01)

(58) Field of Classification Search
CPC ......... F24F 11/46; F24F 5/0003; F24D 15/02; F24D 15/04; F24D 19/1051; F24H 1/00; G01F 1/05; G01F 1/661; G01K 1/14; G01K 13/02; G01K 13/026; G05B 19/042; G05B 2219/2614
See application file for complete search history.

(56) References Cited

U.S. PATENT DOCUMENTS

| | | |
|---|---|---|
| 7,103,272 B2 | 9/2006 | Baxter |
| 8,064,757 B2 | 11/2011 | Patterson et al. |
| 9,213,998 B2 | 12/2015 | Besore et al. |

(Continued)

FOREIGN PATENT DOCUMENTS

WO     2015121856     8/2015

*Primary Examiner* — Gary Collins
(74) *Attorney, Agent, or Firm* — Kanika Radhakrishnan; Evergreen Valley Law Group

(57) ABSTRACT

The present disclosure provides methods and systems for tracking temperature profile of water in a hot water storage tank. The method performed by a control unit includes monitoring flow of water at one or more inlets and one or more outlets included in the tank to determine current locations of a plurality of water layers within the tank. The plurality of water layers changes corresponding positions within the tank based on water entering within and exiting from the tank. The method includes receiving a series of temperature values measured at a series of time instances from at least one temperature sensor mounted to the tank. The method includes electronically generating a temperature profile of the tank based at least on the current locations of the plurality of water layers and the series of temperature values.

20 Claims, 8 Drawing Sheets

(51) Int. Cl.
 *F24F 5/00* (2006.01)
 *F24D 15/04* (2006.01)

(56) References Cited

U.S. PATENT DOCUMENTS

| | | |
|---|---|---|
| 9,310,098 B2 | 4/2016 | Buescher et al. |
| 9,341,390 B2 | 5/2016 | van der Heijden et al. |
| 10,642,289 B1 | 5/2020 | Reeder |
| 2005/0155364 A1* | 7/2005 | Concha .................. F25B 9/008 |
| | | 62/238.7 |
| 2011/0211612 A1 | 9/2011 | Branecky |
| 2013/0197827 A1 | 8/2013 | Besore et al. |
| 2014/0321839 A1* | 10/2014 | Armstrong .......... F24D 19/1063 |
| | | 392/498 |
| 2018/0238587 A1 | 8/2018 | Roddy |

* cited by examiner

| TIME INSTANT 302 | TEMPERATURE SENSOR READING 304 | MEASURED VOLUME OF HOT WATER ENTERING THE TANK 306 | MEASURED VOLUME OF HOT WATER EXITING THE TANK 308 |
|---|---|---|---|
| T1 | 66°F | 5 GALLON | 5 GALLON |
| T2 | 66°F | 5 GALLON | 5 GALLON |
| T3 | 66°F | 5 GALLON | 5 GALLON |
| T4 | 66°F | 5 GALLON | 5 GALLON |
| T5 | 66°F | 5 GALLON | 5 GALLON |
| T6 | 66°F | 5 GALLON | 5 GALLON |
| T7 | 80°F | 5 GALLON | 5 GALLON |
| T8 | 113°F | 5 GALLON | 5 GALLON |
| T9 | 140°F | 5 GALLON | 5 GALLON |
| T10 | 140°F | 5 GALLON | 5 GALLON |
| T11 | 140°F | 5 GALLON | 5 GALLON |
| T12 | 140°F | 5 GALLON | 5 GALLON |
| T13 | 140°F | 5 GALLON | 5 GALLON |
| T14 | 140°F | 5 GALLON | 5 GALLON |
| T15 | 140°F | 5 GALLON | 5 GALLON |
| T16 | 140°F | 5 GALLON | 5 GALLON |

| LEVEL OF WATER FROM TOP TANK (GALLONS) 322 | TEMPERATURE OF LAYER 324 | THERMAL LOSS 326 |
|---|---|---|
| 0 | NOT MEASURED, CAN BE CALCULATED IF KNOWN TEMPERATURE AND FLOW AT INLET | |
| 5 | NOT MEASURED, CAN BE CALCULATED IF KNOWN TEMPERATURE AND FLOW AT INLET | |
| 10 | NOT MEASURED, CAN BE CALCULATED IF KNOWN TEMPERATURE AND FLOW AT INLET | |
| 15 | NOT MEASURED, CAN BE CALCULATED IF KNOWN TEMPERATURE AND FLOW AT INLET | |
| 20 | 140 (MEASURED) | 140 |
| 25 | 140 (MEASURED) | 140*(1+T1*TEMP LOSS) |
| 30 | 140 (MEASURED) | 140*(1+T2*TEMP LOSS) |
| 35 | 140 (MEASURED) | 140*(1+T3*TEMP LOSS) |
| 40 | 140 (MEASURED) | 140*(1+T4*TEMP LOSS) |
| 45 | 140 (MEASURED) | 140*(1+T5*TEMP LOSS) |
| 50 | 140 (MEASURED) | 140*(1+T6*TEMP LOSS) |
| 55 | 140 (MEASURED) | 140*(1+T7*TEMP LOSS) |
| 60 | 140 (MEASURED) | 140*(1+T8*TEMP LOSS) |

METHODS AND SYSTEMS FOR TRACKING THERMAL PROFILE OF HOT WATER STORAGE TANKS

This invention was made with Government support under grant 1938079 awarded by the National Science Foundation. The Government has certain rights to this invention.

TECHNICAL FIELD

The present disclosure relates to methods and systems for tracking thermal profile of hot water storage tanks.

BACKGROUND

In a hot water storage tank, water may be stored in a stratified manner (i.e., separate layers) with the warmest water at the top storage level of the tank, and the coldest water at the bottom of the tank. Such hot water storage tanks may be used in residential, commercial or industrial applications. A temperature profile of water stored in a stratified manner in the hot storage tank is needed to know the amount of usable hot water, and estimate the time and energy to reheat the water stored in the hot storage tank. Further, the knowledge of the temperature profile can be used to improve the operational performance and energy efficiency of systems using hot water storage tanks.

Conventionally, the hot water storage tanks deployed in homes or other buildings for operational use contain a small number of temperature sensors, most often one, located at a fixed location of the tank. Further, in some cases, when temperature stratification measurements are needed, for example for the purposes of research or manufacturer performance testing of new tanks, temperature sensors may be installed at various points of the tank. The sensors may form a sensor ladder installed inside or on the side of the tank. In both cases of one sensor or multiple sensors, flow meters measuring the inflow or outflow of water into or out from the tank are not used to support temperature measurements. Further, in both cases, the method associated with this type of measurement system determines the temperature at the location of the sensor over a given period of time. It does not measure or determine the temperature at other locations of the tank. Knowledge of the temperature within the tank can be improved by further increasing the number of temperature sensors for research systems, but this will add to the cost of the system, and is typically not available for operational systems.

In addition, at various points of time in a day, there may be inflow or outflow of water into or out from the hot water storage tank. In one scenario, the water may enter into or exit from the tank. As such, based on the inflow or outflow of the water in the hot water storage tank, the location of the water in different layers may change, which changes the thermal profile of the hot water storage tank. To this effect, usage of one or multiple temperature sensors throughout the tank for determining the thermal profile without accounting for inflow or outflow results in a static measurement of temperature at one or more temperature sensor locations, and does not capture what is happening between these locations. Further, lack of accuracy in determining the temperature profile of the tank results in an inability to estimate the amount of energy stored in the tank. This results in excess cost and increased consumption of electrical power supply or other form of energy to recharge the water unnecessarily, or alternatively underperformance if insufficient hot water is available.

Therefore, there is a need for techniques that can overcome one or more limitations stated above in addition to providing other technical advantages.

SUMMARY

Various embodiments of the present disclosure provide methods and systems for tracking thermal profile of a hot water storage tank.

In an embodiment, a system for tracking the thermal profile of a hot water storage tank is disclosed. The system includes a hot water storage tank. The hot water storage tank includes one or more inlets and one or more outlets. The hot water storage tank is configured to store water. Water at multiple temperatures is stored in form of multiple layers of water. The system further includes at least one temperature sensor, a set of flowmeters, and a control unit. The at least temperature sensor is mounted to the hot water storage tank. The set of flowmeters is mounted at the one or more inlets and the one or more outlets. The set of flowmeters is configured to measure flow of water at the one or more inlets and the one or more outlets of the hot water storage tank. The control unit is communicably coupled to the set of flowmeters and the at least one temperature sensor. The control unit is configured to at least monitor flow of water at the one or more inlets and the one or more outlets to determine current locations of a plurality of water layers within the hot water storage tank. The plurality of water layers changes corresponding positions within the hot water storage tank based on water entering within and exiting from the hot water storage tank. The control unit is configured to receive a series of temperature values measured at a series of time instances from the at least one temperature sensor. The control unit is configured to electronically generate a temperature profile of the hot water storage tank based at least on the current locations of the plurality of water layers and the series of temperature values.

In another embodiment, a method performed by a control unit for tracking thermal profile of a hot water storage tank is disclosed. The method includes monitoring flow of water at one or more inlets and one or more outlets included in a hot water storage tank to determine current locations of a plurality of water layers within the hot water storage tank. The plurality of water layers changes corresponding positions within the hot water storage tank based on water entering within and exiting from the hot water storage tank. The method further includes receiving a series of temperature values measured at a series of time instances from at least one temperature sensor mounted to the hot water storage tank. Further, the method includes electronically generating a temperature profile of the hot water storage tank based at least on the current locations of the plurality of water layers and the series of temperature values.

In yet another embodiment, a method performed by a control unit for tracking thermal profile of a hot water storage tank is disclosed. The method includes monitoring flow of water at one or more inlets and one or more outlets included in a hot water storage tank to determine current locations of a plurality of water layers within the hot water storage tank. The plurality of water layers changes corresponding positions within the hot water storage tank based on water entering within and exiting from the hot water storage tank. The method further includes receiving a series of temperature values measured at a series of time instances from at least one temperature sensor mounted to the hot water storage tank. Further, the method includes electronically generating a temperature profile of the hot water storage tank based at least on the current locations of the plurality of water layers and the series of temperature values. Furthermore, the method includes determining an operating time of a heating unit for recharging the volume of water flowing from the hot water storage tank. The operating time is determined based on the temperature profile of water in the hot water storage tank.

Other aspects and example embodiments are provided in the drawings and the detailed description that follows.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers:

FIG. 3A is an example representation of a table depicting temperature measurements of a plurality of water layers based on volume of water entering or exiting the hot water storage tank over a period of time, in accordance with an embodiment of the present disclosure;

FIG. 3B is an example representation of a table depicting the temperature profile of the hot water storage tank, in accordance with an embodiment of the present disclosure;

Figure 1:
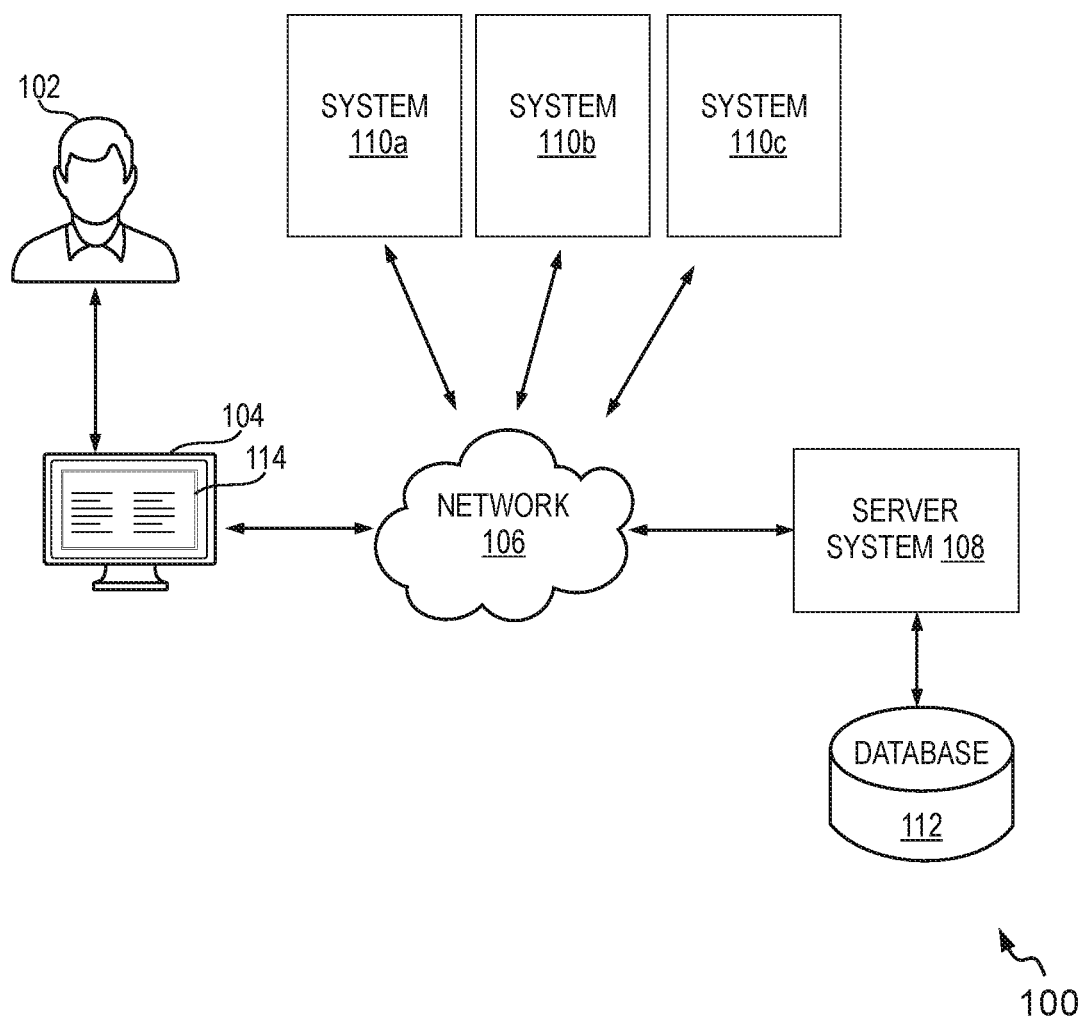
FIG. 1 is an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Herein, term "temperature sensor(s)", wherever used in the present disclosure, refer to the presence of one or more temperature sensors.

Further, discrete amounts of water within the tank may for convenience within this document be referred to as "layers" with given average temperatures, even though the water within each layer may not have the exact same temperature.

Overview

Various embodiments of the present disclosure provide methods and systems for tracking the thermal profile of a hot water storage tank. A system includes a hot water storage tank and means for tracking the thermal profile of the water inside the hot storage tank. The hot water storage tank or the hot storage tank is configured to store the water in a stratified manner. For example, different layers of water may be present in the hot water storage tank and each water layer has a different temperature (i.e., hot, lukewarm, and cold water).

The system may also include at least one temperature sensor mounted to the hot water storage tank. The temperature sensors may be mounted in a variety of ways. For example, in one form, temperature sensor(s) is surface mounted to the hot water storage tank. Alternatively or additionally, temperature sensor(s) is mounted inside the hot water storage tank. Alternatively or additionally, temperature sensor(s) is mounted at inlets and outlets of the hot water storage tank. Accordingly, it should be noted that the temperature sensor(s) can be mounted at any suitable location so that the temperature sensor(s) is configured to measure the temperature of water at different locations inside the hot storage tank or at the inlets and the outlets. Additionally, the hot water storage tank is mounted with a set of flowmeters at corresponding inlet ports and outlet ports of the hot water storage tank. The system also includes a heating unit configured to generate either the hot water or the cold water to the tank. Further, the system includes a control unit that is configured to record the measurements of flow of water into and out of the tank and temperature at all the sensor locations over a period of time. In general, a spatial knowledge of the temperature within the hot storage tank is built up over a period of time, using point temperature measurements over time combined with measurements of volume of water entering or exiting from the hot storage tank, respectively.

Considering an embodiment in which only one temperature sensor is mounted within the tank, the temperature of the water layer present near the temperature sensor is determined at periodic time intervals. In an example, water may enter within the hot storage tank from the top. In this case, the volume of water entered within the tank over a period of time may be measured by the corresponding flowmeter of the hot water storage tank. It should be noted that the water layer which was previously near the temperature sensor is displaced from its original position to a position below its original position in the tank, depending upon the usage of the water from the tank. The flowmeter data may be utilized by the control unit to determine the time when each water layer last flowed past the location of the temperature sensor. The distance by which each water layer has moved downwards or upwards within the hot water storage tank, is determined based on the flowmeter measurements of the volume of water entering within and/or exiting from the hot water storage tank over a period of time and geometrical dimension (e.g., a diameter or other dimension) of the hot water storage tank.

In the above embodiment, the temperature sensor progressively measures the temperature of each water layer present at the level of the temperature sensor when there is inflow or outflow of water in the hot storage tank over the period of time. The temperature of each water layer (i.e., at different locations based on inflow or outflow of water), measured progressively by the at least one temperature sensor over a period of time is utilized for building a time dependent thermal profile of the hot water storage tank. In other words, this method provides a recursive calculation scheme where the temperature of the water at one fixed location in the tank is measured over time, building up a location profile of water temperature in the tank as water passes by this sensor when the water enters and exits the tank. Similarly, if there are multiple temperature sensors are used, corresponding temperature measurements are used to build up location profiles of water temperature relative to corresponding positions of the multiple temperature sensors.

Further, the control unit is also configured to calculate an operating time of the heating unit required to heat the incoming volume of water to the hot water storage tank to meet the needs of the user. The time required by the heating unit is determined based at least on the thermal profile data of the latest iteration which provides information about the temperature of the water at different levels in the tank. Upon heating the water, the heating unit may circulate the hot water to the hot water storage tank for recharging the hot water within the hot water storage tank.

The control unit is communicably coupled to a server system. The server system is communicably coupled to a device associated with a user. The user may provide inputs in an application installed in the device. For example, the user may request that more hot water will be needed than usual to meet the need of visitors. The server system may receive the request and communicate with the control unit to provide a larger reserve of hot water than normally to the hot water storage tank, using knowledge of the temperature profile in the tank with the method and system described above.

Although process steps, method steps or the like in the disclosure may be described in sequential order, such processes and methods may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred.

Various embodiments with respect to methods and systems for tracking thermal profile of a hot water storage tank are described in FIG. 1 to FIG. 6.

FIG. 1 is an example representation of an environment 100 related to at least some example embodiments of the present disclosure. The environment 100 includes a user 102. The user 102 may be an individual or an entity, who is in need of a hot water supply or a cold water supply from a system, such as systems 110*a*, 110*b*, and 110*c*. The systems 110*a*-110*c* may be water supply systems at residential places, commercial places or industrial places. The user 102 is associated with a device 104 for providing input information to a server system 108 via a network 106. The input information may include, but is not limited to, a requirement of hot water, a quantity and temperature of required water, a variation in a temperature of the hot water supply or the chilled water supply, a variation in the temperature of conditioning an enclosure or any other information required for operation of the server system 108, and the systems 110*a*, 110*b*, 110*c*. The user 102 may provide the input information to the server system 108 using an interactive analytic application 114 (hereinafter referred to as 'application 114') made available at the device 104. The device 104 may include devices, such as laptops, tablets, desktops, smartphones, wearable devices, workstation terminals or other computing devices with network interfaces, such as micro-PCs, smart watches, etc.

The network 106 may be a centralized network or a decentralized network or may include a plurality of sub-networks that may establish a direct communication or indirect communication between the user 102 and the server system 108. The systems 110*a*-110*c* may be communicably connected to the server system 108 via the network 106. Typical examples of the network 106 include, but are not limited to, a wireless or wired Ethernet-based intranet, a local or wide-area network (LAN or WAN), and/or global communications network known as the Internet, which may accommodate many different communications media and protocols.

The server system 108 is configured to host and manage the application 114 accessible on the device 104. The application 114 may be accessible through a website associated with the server system 108, so that the user 102 may access the website over the network 106 using web browser applications installed in the device 104 and, thereafter perceive to operate the systems 110*a*-110*c*. In an embodiment, the server system 108 upon receiving a download request is configured to facilitate downloading of an instance of the application 114 at the device 104. In an embodiment, the application 114 may include the Application Programming Interface (API) and other components, which may rest on the server system 108. In this scenario, the application 114 can be made available at application stores, such as Google play store managed by Google®, Apple app store managed by Apple®, etc., and may be downloaded from the application stores to be accessed on devices such as the device 104. In an alternate embodiment, the application 114 may be pre-installed on the device 104 as per the factory settings. In one configuration, the application 114 is also configured to generate and dynamically update a dashboard (not shown in Figures) by including the input information provided by the user 102. In another configuration, the application 114 is also configured to generate and dynamically update the dashboard by including estimated costs associated with usage/utilization of water from the systems 110a-110c based on the input information provided by the user 102.

The server system 108 is configured to communicate with the systems 110a-110c, and also can provide instructions to the systems 110a-110c to operate in a desired manner The operation of the systems 110a-110c is explained with reference to FIGS. 2A-2B.

The environment 100 further includes a database 112 configured to store information pertaining to the input information provided by the user 102. The input information may be the information pertaining to the temperature of hot water and cold water required by the systems 110a-110c. The database 112 may also be configured to store data pertaining to the determined temperatures, volumes of water required at a given time, capacities of the storage tanks and the like. Further, the database may store information on times when it will be less expensive to operate the heating unit, or when operating the heating unit will have a lower environmental impact. For example, the database may store information on times when the electricity from the grid is primarily sourced from renewable sources and hence has lower emissions, or it may store information on when solar panels on the facility in which the system is located may be operating, providing clean, free electricity to operate the system and so on. The database 112 may be maintained by a third party or embodied within the server system 108.

Figure 2A:
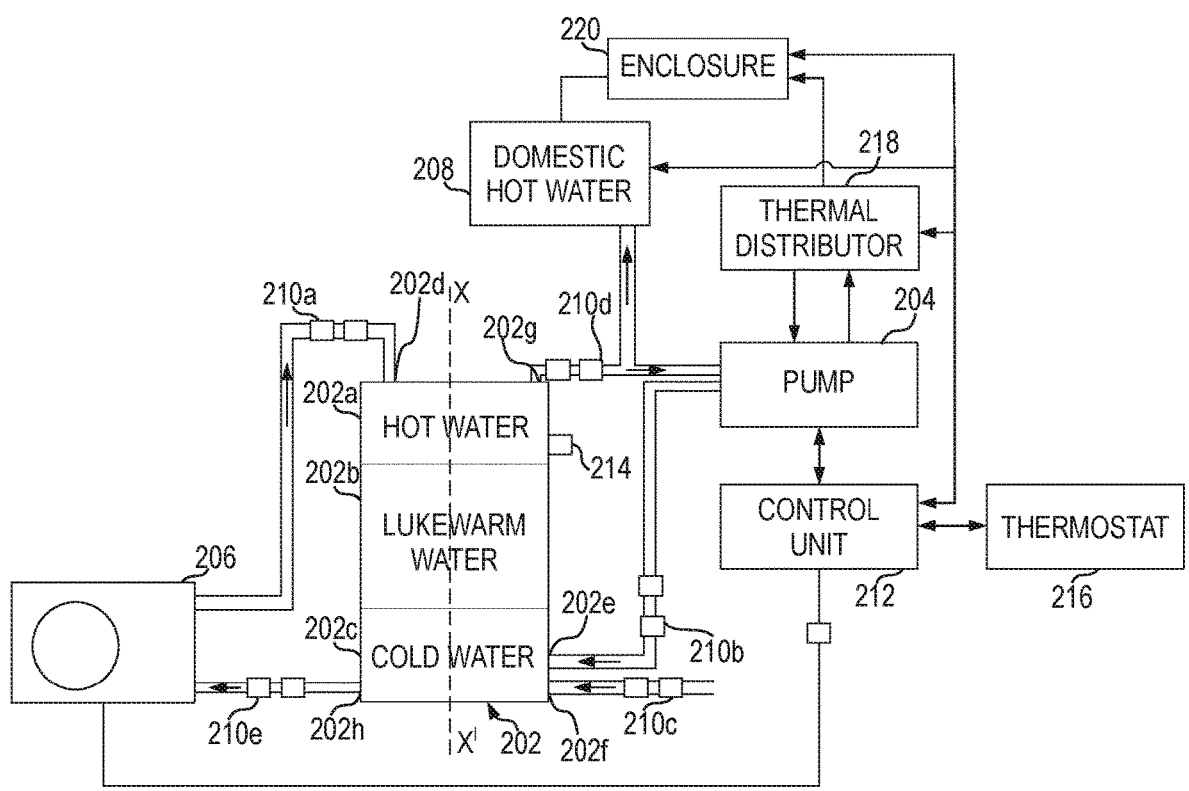
FIG. 2A and 2B are schematic representations of a system for tracking a temperature profile of a hot water storage tank, in accordance with some example embodiments of the present disclosure.
Figure 2B:
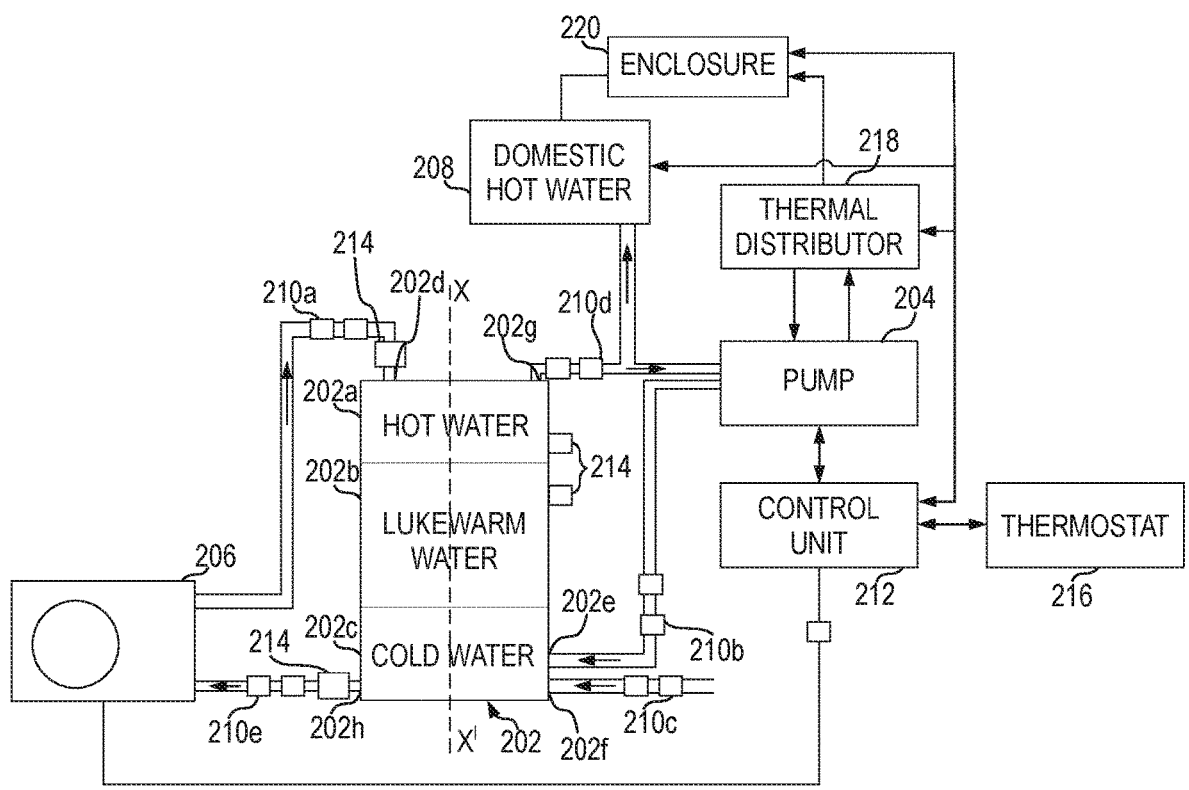

The role of server system 108 for tracking thermal profile of a hot water storage tank is explained in detail with the description of FIGS. 2A-2B.

FIG. 2A is a schematic representation of a system 200 for tracking the thermal profile of a hot water storage tank 202, in accordance with some example embodiments of the present disclosure. The system 200 may be one of the systems 110a, 110b, and 110c as shown in FIG. 1. The system 200 includes the hot water storage tank 202 (hereinafter interchangeably referred to as "tank 202") configured to store water in a stratified manner therein. In other words, the hot water storage tank 202 stores water pertaining to different temperatures in different layers. In a non-limiting example, hot water may remain at top portion 202a of the tank 202, tepid or lukewarm water may remain at middle portion 202b of the tank 202, and cold water may remain at bottom portion 202c of the tank 202. Further, such type of storage of water exhibiting temperature difference (i.e., hot water, tepid water, and cold water) in the tank 202 may be due to formation of thermocline layers (referenced as a line within the tank 202). In one example, the temperature of hot water may vary from about 130° F. to about 170° F. or any other temperature as per feasibility and requirement. The lukewarm water may be the water available in the room temperature, with the temperature range of about 80° F. to about 120° F. or any other temperature as per requirement. Further, the cold water may be the water cooled to the temperature from about 50° F. to about 60° F. or any other temperature as per requirement. The hot water storage tank 202 may be a cylindrical structure or any other structure as per design feasibility and requirements.

The hot water storage tank 202 is configured with one or more inlets 202d, 202e and 202f, and one or more outlets 202g and 202h to route the water from or into the hot water storage tank 202. In one implementation, the inlet 202d and the outlet 202g may be configured at the top portion 202a of the hot water storage tank 202. Further, the inlets 202e and 202f and the outlet 202h may be configured at the bottom portion 202c of the hot water storage tank 202.

The tank 202 is fluidically coupled to the domestic hot water system. The tank 202 is also fluidically coupled to a pump 204 to deliver the water as per the requirements. The pump 204 is fluidically coupled via conduits, to a thermal distributor 218, and an enclosure 220. As such, the pump 204 may deliver hot water for domestic use, or deliver hot or cold water to an air handler to deliver warm or cool air to the house, or deliver hot or cold water to a radiant floor or radiator system, or some other use or combination of additional or listed uses. Without loss of generality, the pump 204 may be one of a positive displacement pump, a peristaltic pump, a centrifugal pump, or any other pump as per design feasibility and requirement. The tank 202 is also fluidically coupled with a heating unit 206, which may be a heat pump or other device capable of heating or cooling water. Further, the heating unit 206 is configured for generating either the hot water or the cold water. More specifically, the heating unit 206 receives water from the bottom portion 202c of the tank 202 via the outlet 202h. The heating unit 206 then heats water to generate hot water. The generated hot water is routed to the top portion 202a of the tank 202 via conduit inlet 202d, for recharging the hot water within the tank 202.

In one implementation, recharging hot water and/or cold water may refer to increasing the volume of the hot water and/or the cold water for use in the system 200. In another implementation, recharging hot water and/or cold water may refer to raising or decreasing the heat content in hot water and/or cold water for use in the system 200. In other words, the heating unit 206 may further heat the hot water by increasing its temperature or may cool the cold water by reducing its temperature. Thus, the term recycling may be considered to apply, based on the necessity or requirement of the system 200.

The system 200 may be configured with a set of flowmeters 210a, 210b, 210c, 210d and 210e mounted at the inlets 202d, 202e, and 202f and the outlets 202g and 202h of the tank 202, respectively. The flowmeters 210a-210e are configured to monitor the flow rate and/or volume of the water entering within and exiting from the tank 202 over a period of time. Further, the flowmeters 210a-210e are communicably coupled with a control unit 212 to determine the volume of hot water in the tank 202. The flowmeters 210a-210e may be one of an optical sensor, a mechanical sensor, or any other sensor as per design requirements.

The system 200 also includes at least one temperature sensor 214 mounted to the tank 202. For example, one or more temperature sensors 214 (e.g., as shown in FIG. 2B) may be surface mounted to the tank 202, may protrude into the tank 202, may be mounted inside the tank 202 and/or may be mounted at inlets and outlets such as the inlets 202d, 202e, and 202f, and the outlets 202g and 202h of the tank 202. In other words, at least one temperature sensor 214 may be disposed at any other suitable position within or onto (or coupled to) the hot water storage tank 202 so that the temperature sensor(s) 214 can measure the temperature of the water at corresponding location(s). In one configuration, a plurality of temperature sensors may also be suitably incorporated throughout the hot water storage tank 202 for example (but not exclusively) by utilizing a 'sensor ladder' framework (not shown in Figures). In one embodiment the system 200 may include temperature sensors located at all or some of inlets and outlets 202a, 202b, 202c, 202e, 202f. These may be in addition to or instead of the temperature sensor 214 and temperature ladder.

In one embodiment, the control unit 212 is communicably coupled with the pump 204, the heating unit 206, the flowmeters 210a-210e, and the temperature sensor 214. The control unit 212 is configured to control operations of the components in the system 200. Additionally, the control unit 212 is also configured to receive input signals from the user 102 via the server system 108, based on which the control unit 212 may operate the system 200. The input signals provided by the server system 108 may be received through a thermostat 216 or directly to the control unit 212. The thermostat 216 may record the need for heating or cooling from the system 200 suitably, and provides the data pertaining to the heating or cooling to the control unit 212.

The water in the hot water storage tank 202 may be stratified by temperature, and for simplicity be assumed to be divided into layers of different average temperatures as explained above. The position of each water layer at a given time is estimated by using the data of the flowmeters 210a-210e, and the temperature of that water layer is determined based on the temperature last measured for that layer one of the temperature sensor(s) 214 of the system 200. In one embodiment, the measured temperature may be adjusted to take into account thermal transfer such as conduction, convection and/or radiation. For instance, data from the flowmeters 210a-210e is utilized to calculate a time T1 when a particular water layer last flowed past the temperature sensor 214. Further, the temperature measurement from the temperature sensor 214 taken at time T1 is used to represent the current temperature of the particular water layer. Further, the measured temperature of the water layer at time T1 may be adjusted by the control unit 212 later in the time due to thermal transfer as described above. The control unit 212 is configured to generate the thermal profile (i.e., building up progressively to provide a snapshot of the temperature) of the tank 202 along a vertical axis X-X' based on a series of temperature measurements taken over various time instances as the water flows into or out of the 202. It is noted that at a given height (i.e., within a given plane orthogonal to the vertical axis X-X') the temperature may be assumed to be uniform and the temperature profile is assumed to be one-dimensional. Such methods of thermal profiling of the tank 202 may be used in thermal storage applications such as, but not limited to, tanks used for commercial and industrial applications, as well as domestic usage for domestic hot water, heating or cooling via air handling units, radiant floors, radiators, and the like.

Further, the control unit 212 may be configured to calculate the time required for operating the heating unit 206 for heating the water from the outlet 202h of the tank 202. In particular, the control unit 212 with access to the thermal profile data of the hot water storage tank 202 determined over a period of time, may calculate the time required for the heating unit 206 to heat the water from the tank 202. Further, the time for operating the heating unit 206 to heat the water is based on the user requirements that is communicated to the control unit 212 as explained above. It is noted that, the capacity or operating time of the heating unit 206 varies based on the calculated temperature profile of the tank 202 and the requirement of the hot water by the user 102.

Further, the hot water from the tank 202 is routed to a domestic hot water distribution system 208 in the system 200 as per the requirements. Additionally, the temperature of the hot water, utilized for the domestic purpose (e.g., shower, household cleaning, and the like) by the user 102, may be preset by the user 102. In another scenario, the hot water or cold water may be routed to the pump 204 for distribution to the enclosure 220 for conditioning i.e. heating or cooling as per the requirements. In particular, the pump 204 distributes the hot water to the thermal distributor 218. Upon receiving either the hot water or the cold water, the thermal distributor 218 distributes the heat content to the enclosure 220 for conditioning. The thermal distributor 218 may be a blower (not shown in the Figures) configured for distributing the heat content into the enclosure 220. Further, accurate knowledge of the temperature profile in the tank 202 will provide information on the amount of hot water that can be delivered to a household over the next day or other time period. As such, if the amount of hot water is determined to be lower than the required amount, the control unit 212, with access to the thermal profile of the water stored in the tank 202, and may further determine the time required by the heating unit 206 for recharging the hot water and initiate its operation.

In an embodiment, the water in the tank may be cooled down, either due to water being in the tank for a long time resulting in loss of heat through thermal losses or due to mixing up with cold water coming in from the utility. In this scenario, the water may be routed to the heating unit 206 for reheating. Thus, there may be a wastage of energy in heating the water due to inefficiency in the prediction of the temperature of the water. As a result, by determining the temperature profile of the water throughout the tank 202, the system 200 helps in minimizing the wastage of energy if the temperature of water in the tank 202 would otherwise be underestimated. The temperature profile of the tank 202 helps in minimizing performance issues where the user 102 does not receive the hot water as per the requirements and the temperature of the water in the tank 202 may otherwise be overestimated. More particularly, based on the thermal profile of the tank 202 estimated while the water enters within or exits from the tank 202, the operating time of the heating unit 206 is determined. As a result, normal regulation of the amount of hot water at a sufficient temperature to meet the user's needs in the hot water storage tank 202 may be improved by heating either more or less water by the heating unit 206 based on the thermal profile of the hot water storage tank 202. The computation of flow rate, volume of water being entered or exited from the tank 202, time when the water layer last flowed past the temperature sensor 214, operating time of the heating unit 206, and thermal loss are collectively utilized for thermal profiling of the hot water storage tank 202.

In another embodiment, a server system (for example the server system 108 shown in FIG. 1) is configured to monitor a volume of water entering within or exiting from a stratified hot water storage tank 202. The server system 108 is also configured to monitor the temperature of the volume of water at a location over time. Further, based on the volume of water entering within or exiting from the hot water storage tank 202, an initial position of the volume of water present in the tank 202 may be altered. In other words, the volume of water previously stored may move downwards in the tank 202 based on the volume of water entering within or exiting from the tank 202. In this scenario, the server system 108 monitors the temperature of water layers at various locations of the hot water storage tank 202 by measuring the temperatures of the water layer at one or more locations over a period of time, and also calculating the movement of the layers throughout the tank 202, thereby accurately ascribing the appropriate temperature measurement to the layer that was at the temperature sensor location at a particular time. Further, the server system 108 may utilize the temperature data of water layers at various locations for thermal profiling of the hot water storage tank 202.

Additionally, the server system 108 may be configured to calculate a time period required for reheating the volume of water incoming from the tank 202. In particular, the time period may be calculated by the server system 108 based on the thermal profile of the tank 202 which provides information pertaining to the temperature of the water at various locations throughout the tank 202.

Referring back to FIG. 2B, the system 200 is shown in which the temperature sensors 214 are shown as mounted at more than one location in the tank 202, and at the inlet 202d and the outlet 202h of the tank 202. Multiple temperature sensors 214 may improve the accuracy of tracking the thermal profile of the tank 202. In particular, temperature sensor(s) 214 are configured to measure the temperature of the volume of water entering and exiting the tank 202 from the inlet 202d and the outlet 202h, respectively. Further, some temperature sensor(s) 214 mounted within the tank 202 measure the temperature of the volume of water entered within the tank 202, when the water layer of the volume of water entered is at the level of the temperature sensor(s) 214. Measuring the temperature of the water layer at different locations provides accurate temperature of the water layer when entering and exiting the tank 202. For instance, the water entering the tank 202 may be heated to 90' F, and the temperature when the water exits the tank 202 may be less than 90' F due to mixing up with the water stored in the tank 202. Thus, the temperature measurements of the water layers at different locations of the tank 202 and at the inlet 202d and 202h may be utilized to determine an accurate thermal profile of the tank 202.

In this illustrated embodiment of FIG. 2B, a total of four temperature sensors 214 are being used in the system 200, namely temperature sensors S1, S2, S3 and S3. A thermal profile P1 of the water layers in the tank 202 may be generated based on the measurements obtained from the temperature sensor S1. Similarly, thermal profiles P2, P3 and P4 can be generated based on the measurements obtained from the temperature sensor S2, S3, and S4. Without loss of generality, a final temperature profile can be generated using the measurement that was the most recent for a given layer, which may come from different sensors depending on the flows out of and into the tank 202. For instance, if for a given layer of water L1, the measurement measured by the temperature sensor S2 (from among temperature sensors S1 through S4) was the most recent, temperature profile for the layer L1 can be based on the temperature profile provided by the sensor S2. Alternatively, a final temperature profile comprising temperature values at each position within the tank 202 can be generated using an average of the values in the thermal profile P1, P2, P3 and P4. In some embodiment, different weights may be assigned to different thermal profiles while calculating the final temperature profile of the tank. For instance, the temperature sensors within the tank may have higher weighting in calculation of the final temperature profile.

Referring now to FIG. 3A in conjunction with FIGS. 2A-2B, an example representation of a table 300 depicting temperature measurements of a plurality of water layers based on volume of water entering or exiting the tank 202 over a period of time is illustrated. The table 300 includes four columns 302, 304, 306 and 308 that depict the time durations, a series of temperature measurements taken by the at least one temperature sensor 214, and the volume of hot water entering and exiting the tank 202 during a time period between two measurements, respectively.

In the illustrated example, initially, the tank 202 is completely filled with water at a time instant T0. The temperature of the water stored in the tank 202 is exemplary depicted to be 66° F. at time instant TO. Further, at a time interval from T0 to T1, a volume water (V1) enters the tank 202 from the inlet 202d, and simultaneously, the same volume of water exits the tank 202 from the outlet 202h. As such, the temperature sensor 214 measures the temperature at the time interval T0 to T1, when the new water layer (L1) of the volume of water (V1) entered is at the location of the temperature sensor 214. The temperature of the new water layer (L1) may be 140° F. The volume of water entering and exiting the tank 202 from the top portion 202a and the bottom portion 202c, respectively, until the time instant T1 (e.g., for a time duration T1-T0), are determined by the flowmeters 210a and 210b respectively. In general, the flowmeters 210a, 210b, 210c, 210d and 210e are configured to measure the volume of water entering and exiting the tank 202 at each time instant (for e.g., the time instant T1).

Further, as the volume of water enters the tank 202 from the inlet 202d, the water present in the tank 202 moves down in the tank 202 along the vertical axis X-X'. The displacement of the water layers in the tank 202 may be calculated by the control unit 212 based on the data from the flowmeter 210a pertaining to the volume of water entered during time duration T1-T0, and structural configuration of the tank 202. As such, the volume of water entering the tank 202 and geometrical dimension (e.g., diameter) of the tank 202 are collectively utilized to determine the location of the water layer in the tank 202. For example, it is assumed that during the time duration T1-T0, a certain volume of water enters the cylindrical hot water storage tank 202 of constant radius (r) of 0.4 m. The volume of water may enter the tank 202 at a flow rate (F1) of 4 liters per minute over the time duration T1-T0 of 5 min, such that the water layer of the water stored in the tank 202 at the level of temperature sensor 214 will move downwards by a distance (D1). The distance of the water layer moved downward in the tank 202 is computed using the following equation (Eq. 1).

$$\text{Distance}, D1 = F1*(T1-T0)/(pi*r^2) \ldots \quad \text{(Eq. 1)}$$

Where,
pi is a mathematical constant and has a value of approximately 3.14,

The distance (D1) of the water layer may be determined to be 4 centimeters below the point of the temperature sensor 214 after the time duration of 5 minutes based on substituting the values as mentioned above in the equation (Eq. 1).

Further, from the time instants T2 through T6, a volume of water (V2 to V6) enters the tank 202 from the inlet 202d. The volume of water (V2 to V6) entering the tank 202 forms corresponding water layers (L2 to L6). The temperature of the water entering the tank 202 are exemplary depicted to 140' F. As such, the water in the tank 202 moves downwards in the tank 202 based on the volume of water entering and exiting the tank 202 as described above. As shown in FIG. 3A, the temperature of the water stored in the tank 202 is exemplary depicted to be 66' F in spite of the volume of water (V2 to V6) entered the tank 202 at the inlet 202d. It is noted that the water layers (L1 to L6) of corresponding volume of water (V2 to V6) are not at the location of the temperature sensor 214. Therefore, the temperature of the water layers (L1 to L6) are not measured by the temperature sensor 214.

As shown in FIG. 3A, at time instants T7 to T16, the temperature sensor 214 records temperatures higher than 66' F. The higher temperatures measured by the temperature sensor 214 correspond to the temperature of the volume of water at time instants T1-T6. Thus, the water layers of the volume of water entered at the time instants T1-T6 may now pass the temperature sensor 214. In other words, the water layers of the volume of water (V1 to V6) entered at the time instants T1-T6 may be moved down to the level of temperature sensor 214. In one scenario, the volume of water (V1 and V2) entered at time instances T1 and T2 may exhibit a temperature less than 140° F. The lesser temperature value is due to mixing of the water layers (L1 and L2) with the volume of water initially stored in the tank 202 as the water layers enter and move down the tank 202. The amount of mixing will depend on parameters such as flow rates, temperature differentials, geometry of the tank 202 and the like. Thus, the measurement of the temperature of the water layers mixed with the water stored in the tank 202 are exemplary depicted to be 80' F. and 113° F. More specifically, the temperature of the water layers (L1 and L2) are at the level of the temperature sensor 214 at time instants T7 and T8 respectively. As a result, temperature of the water layers (L1 and L2) are measured and exemplary depicted to be 80° F. and 113 F. (e.g., as shown in FIG. 3A).

Further, as the volume of water enters the tank 202 from time instants T9-T16, the temperature of the water layers moved down to the level of the temperature sensor 214 are measured as explained above. Thus, the temperature of the water layers at the time instants T9-T16 are measured by the temperature sensor 214 and exemplary depicted to be 140° F. To that effect, the control unit 212 progressively builds a spatial temperature profile T(n) along the X-X' axis of the water at different locations in the tank 202. More specifically, the control unit 212 collectively uses the temperature measurement data from the temperature sensor(s) 214 and data from the flowmeters 210a and 210e pertaining to volume of water entering and exiting the tank 202 to build the temperature profile of the tank 202. The temperature profile T(n) of the tank 202 is herein described in detail with reference to FIG. 3B.

Referring now to FIG. 3B in conjunction with FIGS. 2A-2B and FIG. 3A, an example representation of a table 320 depicting a thermal profile of the hot water storage tank 202 is illustrated. The table 320 includes three columns 322, 324 and 326 that depict water level from top (i.e., top portion 202a) of the tank 202, temperature of water layer, and thermal loss, respectively. Generally, the thermal profile corresponds to a representation of the temperatures of the water layers at different locations in the tank 202. In this configuration, the temperature sensor 214 is installed at a height of 20 gallon point below the top portion 202a of the tank 202. As shown in FIG. 3B, the temperature(s) of the water layer(s) above the level of the temperature sensor 214 are not determined. The complete thermal profile of the tank 202 may be determined by installing additional temperature sensors at corresponding inlets 202d, 202e, and 202f, and the outlets 202g and 202h.

In one implementation, the temperature of a layer Ln that entered the tank 202 at a time t=0 can be calculated based on the data from the flowmeter 210a and temperature sensor 214. Particularly, the flowmeter 210a may measure the flow rate F(t) and cumulative flow Fc(t) of the water entering the tank 202 from the inlet 202d since the time t=0. Further, the temperature sensor 214 measures the temperature at its location T(t) in the tank 202 from times t=0 to t=t. Thus, at a time t, the layer Ln is at distance dn(t) below temperature sensor 214 as explained above with reference to FIG. 3A. The volume of water V(n) between the layer Ln and the temperature sensor 214 may be computed by the following equation (Eq. 2).

$$\text{Volume of water, } V(n) = A * dn(t) \ldots \tag{Eq. 2}$$

Wherein, 'A' is cross-sectional area of the cylindrical hot water storage tank 202.

Further, the time t(n) when layer Ln went past the temperature sensor 214 is computed by using the following equations (Eq. 3) and (Eq. 4.

$$Fc(t(n)) = Fc(t) - Vn(t) \ldots \tag{Eq. 3}$$

$$t(n) = Fc^{-1}[Fc(t) - Vn(t)] \ldots \tag{Eq. 4}$$

Wherein,

'Fc(t)' is the volume of water that has entered the tank 202 since t=0,

'$Fc^{-1}(t)$' is the inverse of function Fc(t)

Further, the temperature of layer Ln is then calculated as T(t(n)), where T(t(n)) is the temperature sensor 214 value at time t(n).

In one implementation, at time duration T1-T0, cold water enters within the tank 202 (i.e., from the inlet 202e) via the pump 204 and measured by flowmeter 202e as the same amount of water is withdrawn from the top portion 202a of the tank 202. In this scenario, the water layers of water in the tank 202 entered during time duration T1-T0 will move upwards in the tank 202, based on the volume of water entered within the tank 202 from the inlet 202e during time duration T2-T1. Over the time, the water layers will move upwards past the temperature sensor 214. As such, the temperature of the water layers is determined at each time instant as the water moves past the temperature sensor 214 due to the inflow of water from the inlet 202e of the tank 202. The central control unit 212 is configured to determine the temperature profile of the tank 202 based on data from the flowmeter 210c pertaining to the volume of water entering and exiting the tank 202 and the series of temperature measurements. Further, the determination of the temperature profile of the tank 202 when the cold water enters the tank 202 from the inlet 202e also remains same as explained above. Thus, over the time instants T1 to T16, estimated temperature values of each layer as it has moved in upward or downward direction in the tank 202 with reference to the location of the temperature sensor 214, are progressively utilized to build temperature profile of the water in the tank 202 (e.g., as shown in FIG. 3B). Further, the temperature profile of the tank 202 determined based on measuring the temperature(s) of the water layer at one or more locations over a period of time correspond to time dependent temperature profile. In general, a thermal profile is a representation of the temperatures at different locations in the hot water storage tank 202 calculated based on continuous measurements taken at one location over a certain period of time in the hot water storage tank 202.

In one implementation, the accuracy of tracking the thermal profile of the hot water storage tank 202 may be improved if the layers for which the temperature is to be measured are made thinner or the frequency of the temperature measurement is increased. As such, the control unit 212 may be configured to operate the flowmeters 210a, 210b, 210c, 210d and 210e, and the at least one temperature sensor 214 to increase the frequency of measurements of temperature and flow within or outside of the tank 202. In another implementation, the accuracy of tracking the thermal profile of the hot water storage tank 202 may be improvised by surface mounting more than one temperature sensor in the tank 202 or at the inlets 202d, 202e and 202f and outlets 202g and 202h of the tank 202. In yet another implementation, the calculation of thermal transfers such as convection, conduction and radiation, can be performed by the control unit 212, and the calculation can be utilized in thermal profiling to enhance the accuracy of the thermal profiling of the tank 202 in the system 200.

Further, the thermal loss, which is a measure of total heat transfer from inside of the tank 202 to the outer environment, may be estimated by the control unit 212 during flow of the water within the tank 202 and during the flow of the water in the conduits of the system 200. The thermal loss may occur in the system 200 either from conduction, convection, radiation, or any combination of these. In one embodiment, the thermal loss may be ignored as a first approximation. In another instance, the time-dependent thermal loss (i.e., depicted in column 326) at each time instants (i.e., the time instants T1-T16) in the tank 202 may be computed by using the following equations (Eq. 5) and (Eq. 6).

$$\text{Thermal loss} = T_{measured} * (1 + (Tn * T_{loss})) \ldots \quad \text{(Eq. 5)},$$

$$T_{loss} = [T_{measured} - T_{ambient}] * \text{temperature loss coefficient} \ldots \quad \text{(Eq. 6)}$$

Wherein,
'$T_{loss}$' is the temperature loss,
'Tn' is the time instants (such as the time instants T1-T16),
'$T_{measured}$' is the temperature of water layer measured at each time instant (T1 to T16) by the temperature sensor 214 (exemplary depicted in columns 304 or 326),
'$T_{ambient}$' is room temperature where the tank 202 is installed, and
Temperature loss coefficient is a proportionality constant between heat flux and the thermodynamic driving force for the flow of heat.

Thus, the thermal loss in the tank 202 is calculated based on the volume of water entering within or exiting from the tank 202, and the temperature of water layer which flowed past the temperature sensor 214 at the particular time instant. It should be noted that the thermal loss calculation can also performed progressively at each time instant (T1 to T16) when the water is entering within or exiting from the tank 202. In one implementation, the tank 202 may be insulated to minimize the effect of thermal losses over time. Further, if the tank 202 is actively being filled with hot water or hot water is being removed for routing to the domestic hot water distribution system 208, there exists a dominant effect of the inlet and outlet of water into and out from the tank 202 rather than loss of heat from the tank 202.

Figure 4:
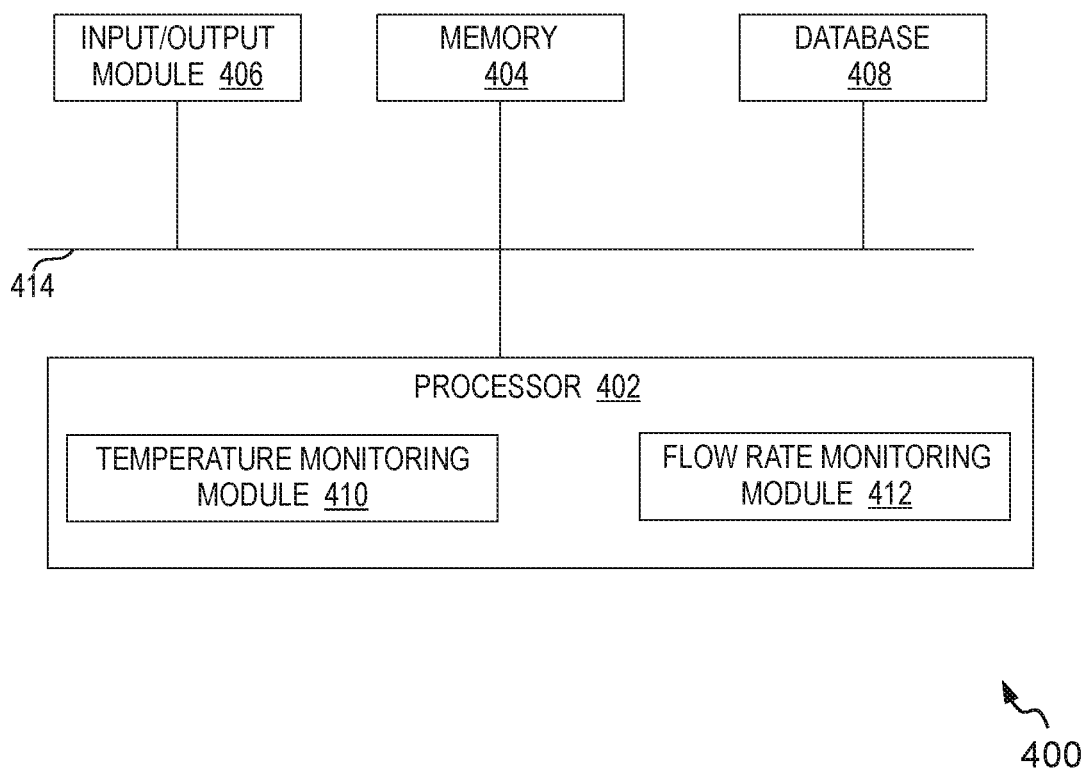
FIG. 4 is a block diagram representation of a control unit of the system of FIGS. 2A-2B, in accordance with an example embodiment of the present disclosure.

FIG. 4 in one exemplary embodiment of the present disclosure, is a block diagram representation of a control unit 400 similar to the control unit 212 as shown in FIGS. 2A-2B configured for operating a system such as the system 200 as shown in FIGS. 2A-2B. The control unit includes various processing modules for operating the system. The processing modules described herein may be implemented by a combination of hardware, software, and firmware components.

The control unit 400 includes a processor 402, a memory 404, an input/output module 406, and a database 408. The one or more components of the control unit communicate with each other via a bus 414. The processor 402 includes a temperature monitoring module 410 and a flow rate monitoring module 412. It is noted that although the control unit is depicted to include only one processor 402, the control unit may include a number of processors. Moreover, it shall be noted that the components are shown for exemplary purposes and the control unit may include fewer or additional modules than those depicted in FIG. 4.

In an embodiment, the memory 404 is capable of storing machine-executable instructions. Further, the processor 402 is capable of executing the machine executable instructions to perform the functions described herein. The processor 402 embodies or is in communication with the components, such as the temperature monitoring module 410 and the flow rate monitoring module 412. In an embodiment, the processor 402 may be embodied as a multi-core processor, a single core processor, or a combination of one or more multi-core processors and one or more single core processors. For example, the processor 402 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 402 may be configured to execute hard coded functionality. In an embodiment, the processor 402 is embodied as an executor of software instructions, wherein the instructions may specifically configure the processor 402 to perform the algorithms and/or operations described herein when the instructions are executed.

The memory 404 may be embodied as one or more volatile memory devices, one or more non-volatile memory devices, and/or a combination of one or more volatile memory devices and non-volatile memory devices. For example, the memory 404 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash memory, RAM (random access memory), etc.).

In an embodiment, the input/output module 406 may include mechanisms configured to receive input signals or inputs from a user such as the user 102 as shown in FIG. 1 and also provide output to the user via an application such as the application 114 as shown in FIG. 1. To that effect, the input/output module 406 may include at least one input interface and/or at least one output interface. As such, the input signal from the user 102 corresponds to the instructions for operating the system.

The control unit 400 includes a database 408 configured for storing information pertaining to the input signals provided by the user. The database 408 may also be configured to store information exchanged or generated during each step of the analysis by the processor 402, for operating the system. The database 408 may be encrypted suitably for ensuring the security of the stored information. The database 408 may also be configured to maintain log of the data processed by each of the modules (such as the temperature monitoring module 410 and the flow rate monitoring module 412) within the processor 402. The log allows the user to track and understand the analysis performed by the processor 402.

The temperature monitoring module 410 may be configured to monitor the temperatures associated with the water stored in the tank. Particularly, the module 410 is configured to monitor the operating temperatures of the water, entering within or exiting from the hot water storage tank. More specifically, the module 410 monitors the temperature of the water (hot water or cold water) measured by a temperature sensor such as, the temperature sensor 214 depicted in FIGS. 2A-2B, either continuously or when the water is entering and exiting the tank during each time duration. As such, the temperatures measured by the temperature sensor over a period of time durations (e.g., the time durations T1-T16) are utilized by the processor 402 of the control unit 212 to progressively build up a temperature map or for thermal profiling of the hot water storage tank.

The module 412 may be configured to monitor a flow rate and a cumulative flow meter value associated with the water in the hot water storage tank. In particular, the module 412 is configured to monitor the flow rate and cumulative flow meter value during inflow or outflow of the water in the hot water storage tank. As such, the module 412 may be configured to determine the time when each layer of water last flowed from the position where temperature sensor is located. Further, the processor 402 of the control unit has access to the time when each layer of water last flowed past the temperature sensor and diameter of the hot water storage tank. The processor 402 may utilize the time and structural dimensions of the tank to determine the location of the water layer in the hot water storage tank for which the temperature was measured at a previous time duration. Further, the processor 402 is configured to calculate the operating time of a heating unit such as, the heating unit 206 depicted in FIGS. 2A-2B, based on thermal profile of the tank which is already explained in previous paragraphs.

Figure 5:
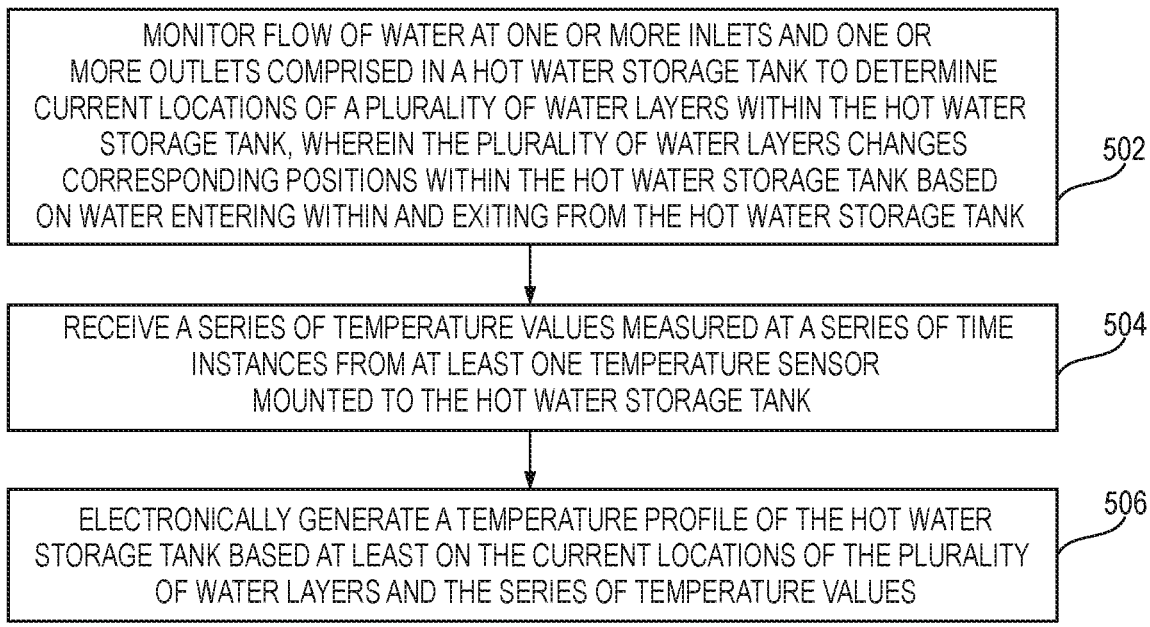
FIG. 5 is a flow diagram depicting a method for tracking the thermal profile of the hot water storage tank, in accordance with an embodiment of the present disclosure.

FIG. 5 represents a flow diagram depicting a method 500 for tracking the thermal profile of a hot water storage tank, for example the hot water storage tank 202 as shown in FIGS. 2A-2B. The method 500 depicted in the flow diagram may be executed by a control unit (e.g. the control unit 212 as shown in FIGS. 2A-2B) or a server system (e.g. the server system 108 as shown in FIG. 1). Operations of the method 500 and combinations of operation in the flow diagram, may be implemented by, for example, hardware, firmware, a processor, circuitry and/or a different device associated with the execution of software that includes one or more computed program instructions. The method 500 starts at operation 502.

At operation 502, the control unit selectively monitors flow of water at one or more inlets and one or more outlets included in a hot water storage tank to determine current locations of a plurality of water layers within the hot water storage tank. The plurality of water layers changes corresponding positions within the hot water storage tank based on water entering within and exiting from the hot water storage tank.

At operation 504 of method 500, the control unit receives a series of temperature values measured at a series of time instances from at least one temperature sensor mounted to the hot water storage tank. The at least one temperature sensor 214 may be surface mounted to the tank 202, may protrude into the tank 202, mounted inside the tank 202 and/or mounted at inlets and outlets, such as the inlets 202d, 202e, and 202f and outlets 202g and 202h of the tank 202.

At operation 506 of method 500, the control unit electronically generates a temperature profile of the hot water storage tank based at least on the current locations of the plurality of water layers and the series of temperature values.

A current location of each water layer in the hot water storage tank when traversed upwards and downwards in the hot water storage tank is determined based at least on the volume of water entered within and exited from the hot water storage tank and the diameter of the hot water storage tank. Further, the operations 502-506, for tracking the thermal profile of the hot water storage tank 202 by the control unit 212 are already described in detail in description pertaining to FIGS. 2A-2B to 4.

Additionally, the control unit determines an operating time of a heating unit for recharging the volume of water flowing from the hot water storage tank based at least on the temperature profile of the hot water storage tank or the temperature of the water incoming to the heating unit. The description pertaining to the operation of the heating unit is already described in detail in descriptions pertaining to FIGS. 2A-2B and 3, and is not reiterated herein for the sake of brevity.

In an embodiment, the control unit determines a time when each water layer last flowed past the temperature sensor based at least on measurements of cumulative flow meter value and the volume of water entered within and exited from the hot water storage tank via a set of flowmeters coupled to the control unit. The control unit further generates the temperature profile of water in the hot water storage tank based at least on a temperature value measured for each water layer by the temperature sensor and the time when each water layer last flowed past the temperature sensor.

It is noted that the hot water storage tank includes hot water settled at a top portion of the hot water storage tank, tepid water settled at a center portion of the hot water storage tank, and cold water settled at a bottom portion of the hot water storage tank. The cold water settled at the bottom portion of the hot water storage tank is routed to the heating unit for generating hot water. At least one of the hot water and the cold water is routed to the domestic water supply and one of the hot water and cold water is routed to a pump for distribution as heating or cooling.

Figure 6:
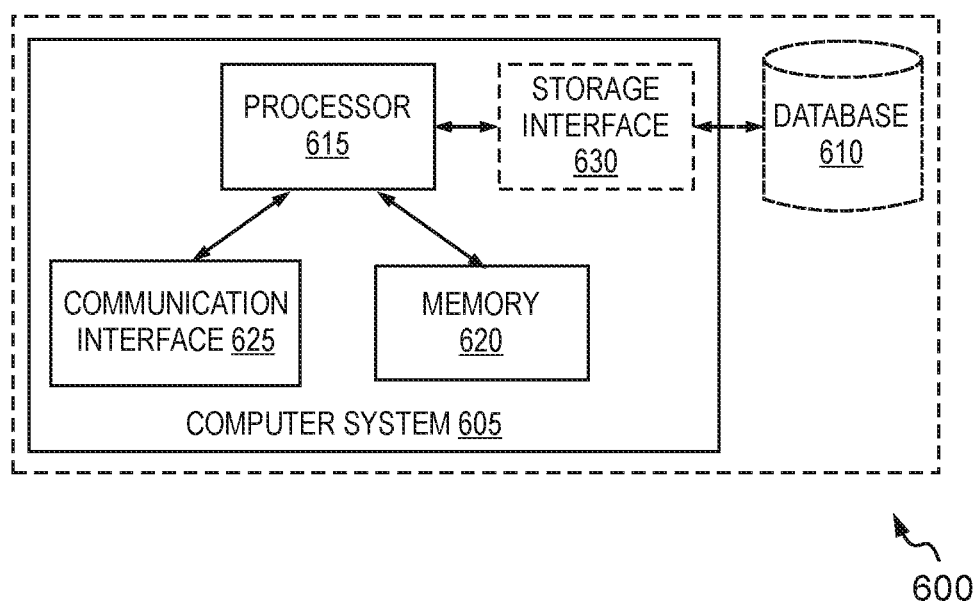
FIG. 6 is a block diagram of a server capable of implementing at least some embodiments of the present disclosure.

FIG. 6 illustrates a block diagram representation of a server system 600 capable of implementing at least some embodiments of the present disclosure. The server system 600 is configured to host and manage an application such as the application 114 that is provided to an electronic device such as the device 104, in accordance with an example embodiment of the disclosure. An example of the server system 600 is the server system 108 shown and described with reference to FIG. 1. The server system 600 includes a computer system 605 and a database 610.

The computer system 605 includes at least one processor 615 for executing instructions. Instructions may be stored in, for example, but not limited to, a memory 620. The processor 615 may include one or more processing units (e.g., in a multi-core configuration).

The memory 620 is a storage device embodied as one or more volatile memory devices, one or more non-volatile memory devices, and/or a combination of one or more volatile memory devices and non-volatile memory devices, for storing micro-contents information and instructions. The memory 620 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The processor 615 is operatively coupled to a communication interface 625 such that the computer system 605 is capable of communicating with a mobile device, for example, the device 104 or with any entity within the network 106 via the communication interface 625.

The processor 615 may also be operatively coupled to the database 610. The database 610 is any computer-operated hardware suitable for storing and/or retrieving data, such as, but not limited to, the input information, the temperature data, the load data (such as the volume of water in the hot water storage tank 202), data obtained during operation of the system 200 and the like. The database 610 may include multiple storage units such as hard disks and/or solid-state disks in a redundant array of inexpensive disks (RAID) configuration. The database 610 may include a storage area network (SAN) and/or a network attached storage (NAS) system.

In some embodiments, the database 610 is integrated within the computer system 605. For example, the computer system 605 may include one or more hard disk drives as the database 610. In other embodiments, the database 610 is external to the computer system 605 and may be accessed by the computer system 605 using a storage interface 630. The storage interface 630 is any component capable of providing the processor 615 with access to the database 610. The storage interface 630 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 615 with access to the database 610.

The processor 615 is communicably coupled with the memory 620 and the communication interface 625. The processor 615 is capable of executing the stored machine executable instructions in the memory 620 or within the processor 615 or any storage location accessible to the processor 615. The processor 615 may be embodied in a number of different ways. In an example embodiment, the processor 615 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. The processor 615 performs various functionalities of the server system 600 as described herein.

The disclosed methods with reference to FIGS. 1 to 6, or one or more operations of the flow diagrams of method 500 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers.

Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system, comprising:
    a hot water storage tank comprising one or more inlets and one or more outlets, the hot water storage tank configured to store water, wherein water at multiple temperatures is stored in form of multiple layers of water;
    at least one temperature sensor mounted to the hot water storage tank;
    a set of flowmeters mounted at the one or more inlets and the one or more outlets, the set of flowmeters is configured to measure flow of water at the one or more inlets and the one or more outlets of the hot water storage tank to measure a volume of water entering within and exiting from the hot water storage tank; and
    a control unit communicably coupled to the set of flowmeters and the at least one temperature sensor, the control unit configured to at least:
        receive data pertaining to the volume of water entering within and exiting from the hot water storage tank from the set of flow meters, wherein a plurality of water layers changes corresponding positions within the hot water storage tank based on the water entering within and exiting from the hot water storage tank;
        receive a series of temperature values measured at a series of time instances from each of the at least one temperature sensor; and
        electronically generate a temperature profile of the hot water storage tank for each of the at least one temperature sensor, wherein the temperature profile for each of the at least one temperature sensor is generated based at least on the data pertaining to the volume of water entering within and exiting from the hot water storage tank and the series of temperature values received from the corresponding temperature sensor.

2. The system as claimed in claim 1, wherein the control unit is configured to determine an operating time of a heating unit for recharging the volume of water flowing from the hot water storage tank, the operating time being determined based on the temperature profile of water in the hot water storage tank.

3. The system as claimed in claim 1, wherein the control unit is configured to determine a current location of each water layer in the hot water storage tank when traversed upwards and downwards in the hot water storage tank based at least on the volume of water entered within and exited from the hot water storage tank and dimensions of the hot water storage tank.

4. The system as claimed in claim 1, wherein the control unit is further configured to:
   determine a time when each water layer last flowed past the at least one temperature sensor based at least on measurements of cumulative flow meter value and the volume of water at least entered within and exited from the hot water storage tank via the set of flowmeters; and
   generate the temperature profile of water in the hot water storage tank based at least on a temperature value measured for the water layers by the at least one temperature sensor and the time when each water layer last flowed past the at least one temperature sensor.

5. The system as claimed in claim 1, wherein the hot water storage tank includes hot water settled at a top portion of the hot water storage tank, tepid water settled at a center portion of the hot water storage tank, and cold water settled at a bottom portion of the hot water storage tank, and wherein the cold water settled at the bottom portion of the hot water storage tank is routed to a heating unit for generating hot water.

6. The system as claimed in claim 5, wherein the control unit is configured to generate a final thermal profile based on thermal profiles generated from temperature values of each temperature sensor where multiple temperature sensors are present in the system.

7. The system as claimed in claim 6, wherein the control unit is configured to generate the final temperature profile based on different weightings of the thermal profiles.

8. The system as claimed in claim 6, wherein the control unit is configured to generate the final temperature profile in which temperature profile for a given layer of water is based on temperature measurement that was the most recent for the given layer of water depending upon flow of the given layer of water into or out of the hot water storage tank.

9. The system as claimed in claim 5, wherein at least one of the hot water and the cold water is routed to at least one of:
   a pump to deliver heating or cooling to an enclosure for conditioning, and
   domestic water supply.

10. A method performed by a control unit, the method comprising:
    receiving data pertaining to a volume of water entering within and exiting from a hot water storage tank from a set of flow meters coupled to the control unit, wherein a plurality of water layers changes corresponding positions within the hot water storage tank based on the water entering within and exiting from the hot water storage tank;
    receiving a series of temperature values measured at a series of time instances from each of at least one temperature sensor mounted to the hot water storage tank; and
    electronically generating a temperature profile of the hot water storage tank for each of the at least one temperature sensor, wherein the temperature profile for each of the at least one temperature sensor is generated based at least on the data pertaining to the volume of water entering within and exiting from the hot water storage tank and the series of temperature values received from the corresponding temperature sensor.

11. The method as claimed in claim 10, further comprising:
    determining an operating time of a heating unit for recharging the volume of water flowing from the hot water storage tank, the operating time being determined based on the temperature profile of water in the hot water storage tank.

12. The method as claimed in claim 10, wherein a current location of each water layer in the hot water storage tank when traversed upwards and downwards in the hot water storage tank is determined based at least on the volume of water entered within and exited from the hot water storage tank and dimensions of the hot water storage tank.

13. The method as claimed in claim 10, further comprising:
    determining a time when each water layer last flowed past the at least one temperature sensor based at least on measurements of cumulative flow meter value and the volume of water entered within and exited from the hot water storage tank; and
    generating the temperature profile of water in the hot water storage tank based at least on a temperature value measured for each water layer by the at least one temperature sensor and the time when each water layer last flowed past the at least one temperature sensor.

14. The method as claimed in claim 10, wherein the hot water storage tank includes hot water settled at a top portion of the hot water storage tank, tepid water settled at a center portion of the hot water storage tank, and cold water settled at a bottom portion of the hot water storage tank, and wherein the cold water settled at the bottom portion of the hot water storage tank is routed to a heating unit for generating hot water.

15. The method as claimed in claim 14, wherein at least one of the hot water and the cold water is routed to the domestic hot water supply.

16. The method as claimed in claim 14, wherein at least one of the hot water and the cold water is routed to a pump to deliver heating or cooling to an enclosure for conditioning.

17. A method performed by a control unit, the method comprising:
    receiving data pertaining to a volume of water entering within and exiting from a hot water storage tank from a set of flow meters coupled to the control unit, wherein a plurality of water layers changes corresponding positions within the hot water storage tank based on the water entering within and exiting from the hot water storage tank;
    receiving a series of temperature values measured at a series of time instances from each of at least one temperature sensor mounted to the hot water storage tank;
    electronically generating a temperature profile of the hot water storage tank for each of the at least one temperature sensor, wherein the temperature profile for each of the at least one temperature sensor is generated based at least on the data pertaining to the volume of water entering within and exiting from the hot water storage tank and the series of temperature values received from the corresponding temperature sensor; and determining an operating time of a heating unit for recharging the volume of water flowing from the hot water storage tank, the operating time being determined based on the temperature profile of water in the hot water storage tank.

18. The method as claimed in claim 17, wherein a current location of each water layer in the hot water storage tank when traversed upwards and downwards in the hot water storage tank is determined based at least on the volume of water entered within and exited from the hot water storage tank and dimensions of the hot water storage tank.

19. The method as claimed in claim 17, further comprising:

determining a time when each water layer last flowed past the at least one temperature sensor based at least on measurements of cumulative flow meter value and the volume of water entered within and exited from the hot water storage tank; and generating the temperature profile of water in the hot water storage tank based at least on a temperature value measured for each water layer by the at least one temperature sensor and the time when each water layer last flowed past the at least one temperature sensor.

20. The method as claimed in claim 17, wherein the hot water storage tank includes hot water settled at a top portion of the hot water storage tank, tepid water settled at a center portion of the hot water storage tank, and cold water settled at a bottom portion of the hot water storage tank, and wherein the cold water settled at the bottom portion of the hot water storage tank is routed to the heating unit for generating hot water.

* * * * *